Oct. 19, 1948.  J. E. GLOVER, JR., ET AL  2,451,941
FLEXIBLE CONNECTION AND SEAL
Filed Nov. 29, 1943

INVENTOR:
JOHN C. HANSON,
JOHN E. GLOVER JR.;
BY
Charles S. Wilson
ATTORNEY.

Patented Oct. 19, 1948

2,451,941

UNITED STATES PATENT OFFICE 2,451,941

FLEXIBLE CONNECTION AND SEAL

John E. Glover, Jr., Queens Village, and John C. Hanson, Hicksville, N. Y., assignors to Republic Aviation Corporation, a corporation of Delaware Application November 29, 1943, Serial No. 512,098

4 Claims. (Cl. 285—129)

This invention relates to flexible connections and seals to connect the abutting or adjoining sections of a conduit, duct or pipe, and is particularly useful where the assembled sections of conduit, pipe or duct are subjected to more or less pronounced vibration or where the individual sections move relatively one to the other from vibration or any other cause.

The instant device is designed to accommodate all movements of the conduit or duct sections at the same time maintaining the joint between the abutting or adjoining ends of said sections sealed against the passage of fluid regardless of the relative positions the sections may occupy.

With the above and other objects in view, as will be apparent, the invention consists in the construction, combination and arrangement of parts, all as hereinafter more fully described, claimed and illustrated in the accompanying drawings, wherein—

Figure 1:
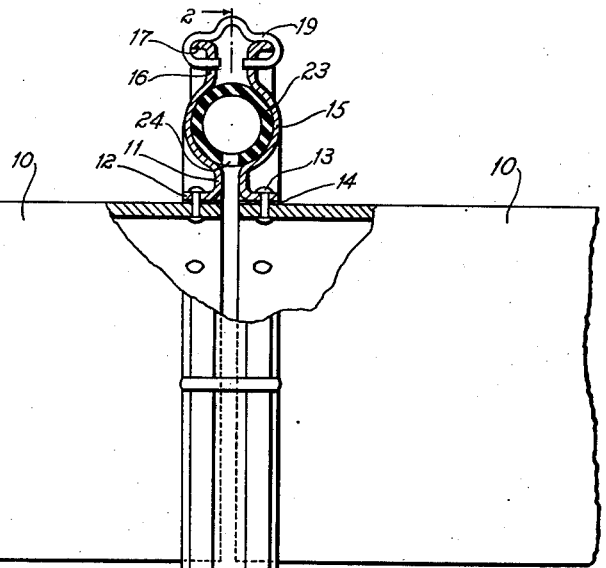
Figure 2:
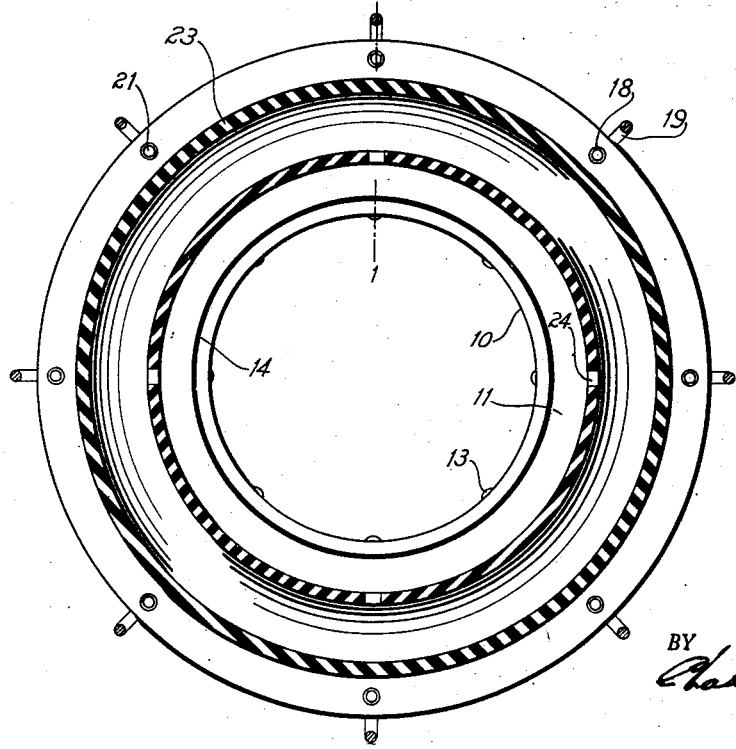

Fig. 1 is an elevation of the present invention flexibly connecting the adjoining ends of a pair of conduit or duct sections and sealing such connection against the passage of fluid, showing the connection and seal partly in transverse section along line 1—1 of Fig. 2; and Fig. 2 is a vertical section taken along line 2—2 of Fig. 1.

The present invention being designed to flexibly connect the abutting or adjoining ends of conduit or duct sections takes the place of a rigid or non-flexible connector or joint. While it is of course of general application and use wherever it is desired to connect and seal the adjoining ends of conduit sections in a fluid tight manner, the present invention is designed primarily for use in conjunction with a conduit or duct formed of relatively movable sections which would render a rigid connection and seal between the sections impractical. For example the ducts leading to and from the turbo-superchargers of aircraft require certain flexibility, as do also tubes or ducts used in conjunction with internal combustion engines, due, at least in part, to the elasticity of the mountings of these mechanisms and the vibration resulting from their operation. This flexibility can be obtained by making the ducts or tubes in sections and so connecting the adjoining ends of the sections as to permit of the required relative movement. In ducts of this character, where the present joint is used and where fluid under pressure is being transmitted through the duct or tube, the sealing of the joint or connection against the pressure within the duct is accomplished by the pressure of the fluid within the duct operating upon the seal to bring it to maximum sealing efficiency. Even where non-flexible or non-sectional conduits or ducts are employed the present invention may, if desired, be used to connect the conduit or duct to the cooperating mechanisms and to seal this connection against the escape of fluid. In any case, the present connection and seal is designed and intended to flexibly connect the adjacent ends of a pair of conduits or conduit sections and to seal this connection, regardless of the general character, purpose, construction or function of the conduit or duct.

Reference being had more particularly to the drawings, 10 designates a pair of aligned conduit or duct sections, the ends thereof lying in relatively close proximity or nearly abutting one against the other. For illustrative purposes these conduit or duct sections 10 are shown as being spaced one from the other, thereby creating an outlet between them, through which fluid within the sections may escape and in any event the relative movability of the section 10 results in a variable condition at the joint which permits the escape of the fluid within the conduit unless said joint and connection is sealed. It is a purpose of the present invention to effectively seal this space between the adjoining ends of the section 10, regardless of its extent, to prevent the escape of the fluid from within the conduit at the same time permitting the relative movement of the connected sections, and to that end employs the pressure of the fluid passing through the conduit to bring the seal to, and maintain it at, its maximum efficiency.

Each conduit section 10, where it adjoins or abuts another section, is provided with an outstanding annulus or ring 11 completely surrounding and embracing the extremity of the section 10 and secured thereto by means of the lateral flange 12 at its inner edge. This flange 12 rests flush or nearly flush with and parallel to the outer surface of the section 10 where it is fastened by welding, rivets or other suitable fastening means, here shown as the rivets 13, to become, in effect, an integral part of the section 10. Where necessary to prevent the escape of fluid through any open space between the flange 12 and the wall of the section 10, a gasket 14, of rubber or similar material, is interposed between the flange 12 and the wall of the section 10.

Outwardly of the flange 12, and at a point somewhat removed therefrom, the ring or annulus 11 is convexed or bulged outwardly so that when two complementary rings 11 cooperate the outwardly convexed or bulged portions 15 thereof combine to form a substantially cylindrical housing. Beyond the convexed portion 15 the body of the ring 11 forms a co-planar extension 16 of that portion of the ring 11 lying between the flange 12 and the convexed or outwardly bulged portion 15. At its extremity this extension 16 has a right angularly disposed flange 17 extending in the same direction as, and substantially parallel to, the flange 12, said flange 17 being somewhat narrower than the flange 12.

Thus a complementary pair of these rings 11 is provided at the adjoining ends of a pair of conduit sections 10, said rings being permanently and in effect integrally secured to their respective sections. Being complementary one to the other, they combine to create a tubular or cylindrical housing 15, which is aligned with and lies across the space or union between the adjoining ends of the sections 10 and which communicates with the interior of the conduit by means of the space or passage between the rings 11 adjoining the sections 10 and the space between the ends of said sections. On the other side of the tubular or cylindrical housing 15 of a complementary pair of rings 11 to the duct or tube sections 10 is provided a pair of spaced substantially parallel extensions 16 provided with the oppositely extending flanges 17 at their outer edges.

In order to provide a means to secure the outer peripheries or edges of a pair of rings 11 together, and yet provide means whereby they can be disengaged or freed one from the other, the extension 16 of each complementary ring is provided at intervals with the apertures or holes 18. The holes 18 of one ring 11 are individually aligned transversely of the pair of rings with the corresponding holes 18 of the companion or complementary ring 11. To secure the outer edges of the complementary rings 11 together, a spring clasp 19 spans the extensions 16 of the rings 11 at each pair of transversely aligned openings 18. This clasp comprises a length of metal or wire rebent upon itself at its ends 20 to create the aligned end portions 21, which act as and constitute locking pins lying parallel to and spaced from the body 19 of the clasp. The clasp 19 as shown in Fig. 1 passes over the flanges 17 of the complementary rings 11 with its pins or end portions 21 seated in the aligned openings 18 between the outwardly convexed or bulged portions 15 of the rings and the flanges 17. The body 19 of each clasp is outwardly bent or looped, as at 22, to add to the normal spring or resiliency of the clasp thereby permitting the clasp to be sprung over the flanges 17 to seat the pins 21 into aligned openings 18 or allowing the removal of the pins 21 from the aligned openings to free the rings 11. Any number of these clasps 19 may be provided and the use of a multiplicity thereof firmly but flexibly secures the rings 11 together in their complementary relationship so that a relative movement between the rings and between the sections 10 to which they are attached is possible.

Within the substantially cylindrical housing 15 created by combining the outwardly convexed or bulged portions of a complementary pair of rings 11 is positioned a continuous flexible, elastic tube 23 completely filling the chamber of this housing. In alignment with the space between the rings 11 adjoining the sections 10, which communicate with the space between the adjacent ends of said sections, the wall of the continuous flexible tube 23 is pierced by a series of vents 24. In this manner the fluid within the conduit, made up of the sections 10, enters between the rings 11 and passes through the vents 24 to the sealing tube 23, creating therein the same fluid pressure as is in the conduit to cause it to intimately contact with the interior surfaces of the convexed or outwardly bulged portions 15. Thus, as long as there is pressure within the conduit there is the same internal pressure within the sealing tube 23 and the connection or union between the adjoining ends of the sections 10 is effectively sealed against leakage.

From the foregoing it will readily be seen that the connection and seal hereinbefore described is not only flexible but that, regardless of the relative positions of the abutting ends of the conduit sections 10 or the relative positions of the rings 11, the sealing tube 23 is in sealing contact with the walls of the housing created by the combined outwardly curved portions 15 of the rings 11 so long as there is pressure within the conduit. It is also apparent that the rings 11 and the sections 10 carrying them by reason of the clasps 19 may move relatively to each other without interfering with the seal or its function or with the attachment of the rings one to the other at their outer peripheries or circumferences. If it is desired to separate or disconnect the sections 10, it is only necessary to remove the clasps 19 from their engaging positions, which will permit the complete separation of the complementary halves of the connection and the complete release of the sections 10 one from the other.

What is claimed is:

1. A flexible and sealing connection between the spaced adjoining ends of approximately aligned and relatively movable conduit sections comprising a pair of relatively thin complementary plates each embracing and secured to the end of one of said conduit sections and having a continuous concavity medially of its width to combine with the concavity of the companion plate to define a continuous hollow housing between said plates, those portions of the plates located outwardly of said housing being approximately parallel and further spaced one from the other than the portions of the plates adjacent the conduit sections, a flexible sealing member mounted in and completely filling said housing, having a series of vents communicating with the space between the conduit ends, and means for circumferentially and flexibly securing said plates together and compressing said seal.

2. A flexible, sealing connection between the spaced, adjoining ends of approximately aligned and relatively movable conduit sections comprising a pair of relatively thin complementary plates each embracing and secured to the end of one of said conduit sections and each having a continuous concavity medially of its width to combine with the similar concavity of the other plate to define a continuous hollow housing between said plates, the peripheral portions of said plates being spaced one from the other a distance greater than the spacing of the portions of the plates adjoining the conduit sections and each plate adjacent its outer periphery being pierced by a series of openings, a flexible sealing member mounted in said housing having a series of vents therein communicating with the space between the ends of the conduit sections, and a series of spring wire clasps spanning the peripheries of said plates the ends of each clasp being bent inwardly to engage and pass through the openings in the plates aforesaid to flexibly secure the circumferences of said plates one to the other, the plates and clasps having sufficient flexibility to provide for substantial flection between the conduit sections.

3. A flexible and sealing connection between the spaced adjoining ends of approximately aligned and relatively movable conduit sections comprising a pair of relatively thin complementary plates each embracing and secured to the end of one of said conduit sections and each having a continuous cavity medially of its width to combine with the similar concavity of the complementary plate to define the continuous hollow housing between said plates, those portions of the plates adjoining the conduit sections being spaced one from the other a distance approximately equal to the spacing between the ends of the conduit sections and the outer or circumferential portions of the plates being spaced one from the other a distance greater than the distance between the adjoining ends of the conduit section, each plate being pierced by a series of apertures between its circumference and concavity, a flange at the circumference of each plate projecting over the exterior of the concavity in said plate, a flexible sealing member mounted in and completely filling said housing and having a series of vents communicating with the space between the ends of the conduit sections, and a plurality of wire clasps spanning the peripheries of said plates each clasp consisting of a section of spring wire bent upon itself at its ends to pass over the peripheral flanges of said plates and be seated in corresponding apertures in the plates, said plates and clasps having sufficient flexibility to provide for substantial flection between the conduit sections.

4. A flexible sealing connection between the spaced adjoining ends of approximately aligned and relatively movable conduit sections comprising a pair of relatively thin plates, each embracing and secured to one of the adjoining ends of the conduit sections, a seal disposed between and compressed by said plates, and a series of spring clasps spanning the peripheries of said plates and removably secured to each, the plates aforesaid having sufficient elasticity to provide substantial flection for said conduit sections.

JOHN E. GLOVER, Jr.
JOHN C. HANSON.

REFERENCES CITED

The following references are of record in the file of this patent:

UNITED STATES PATENTS

| Number | Name | Date |
|---|---|---|
| 1,475,289 | Diescher | Nov. 27, 1923 |
| 1,934,349 | Friend | Nov. 7, 1933 |
| 2,126,505 | Risser | Aug. 9, 1938 |
| 2,178,819 | Timm | Nov. 7, 1939 |